Nov. 25, 1969 W. E. ANGLIN ETAL 3,479,834
METHOD AND APPARATUS FOR AIR CONDITIONING
AUTOMOBILES AND THE LIKE
Filed April 10, 1968 3 Sheets-Sheet 1

INVENTORS
WILLIAM E. ANGLIN
PAUL E. ANGLIN
BY
Roy A. Plant
ATTORNEY

INVENTORS
WILLIAM E. ANGLIN
PAUL E. ANGLIN

INVENTORS
WILLIAM E. ANGLIN
PAUL E. ANGLIN

BY *Roy A. Plant*
ATTORNEY

United States Patent Office 3,479,834
Patented Nov. 25, 1969

3,479,834
METHOD AND APPARATUS FOR AIR CONDITIONING AUTOMOBILES AND THE LIKE
William E. Anglin and Paul E. Anglin, Dallas, Tex., assignors to Capitol Refrigeration, Inc., Dallas, Tex., a corporation of Texas
Filed Apr. 10, 1968, Ser. No. 720,164
Int. Cl. F25b *1/00;* B60h *3/04*
U.S. Cl. 62—115
11 Claims

ABSTRACT OF THE DISCLOSURE

This is an improved automobile air conditioning system where the refrigerant condenser system, for instance, is of tubular type and is of special construction, mounted in front of the automobile radiator, as usual, but has an additional lower section for receiving the superheated refrigerant gas direct from the compressor, with cooling air passing through this lower section and out below the automobile radiator so as to not affect the normal engine cooling operation of the latter. The thus pre-cooled refrigerant gas then passes through a second condenser section directly in front of the automobile radiator and into a third condenser section forward of the second, with refrigerant condensation taking place substantially completely in this third section. Behind the automobile radiator the space is also very limited and in order to belt drive more than the fan, a special adjustable member is added to facilitate tightening the compressor belt as well as the belt, which may be used to drive the fan, and which through various pulleys and belts, may also be utilized to drive a generator and a smog pump.

BACKGROUND OF THE INVENTION

The present invention relates broadly to refrigeration systems, and in its specific phase to modifications of air conditioners for use in automobiles so as to provide greater refrigeration capacity per given quantity of refrigerant vaporized.

Air conditioning of automobiles is becoming more popular not only from the desire for comfortable driving conditions in hot weather but also from the further fact that by closing the automobile windows and turning on the air conditioning, a considerable amount of outside noise is eliminated together with dust and the roar and disturbance caused by air flowing into and out of the automobile body under high-speed driving, high winds, or both. Large automobiles normally have ample space under the hood and behind the radiator for mounting the compressor and its drive, as well as having ample space directly in front of the large radiator for mounting the condenser coils where the compressed refrigerant gas is converted to liquid for delivery to the pressure release valve and evaporator unit for conventionally cooling air in the automobile passenger space. The desire for air conditioned automobiles has expanded to the point where people even wish to use air conditioners in less costly small automobiles where the space under the hood and in front of the small radiator is at a premium, as for instance is the case with the 1968 Opel Kadett. The present invention has been devised with a special view to providing a way to arrange the compressor drive and construct the compressed refrigerant gas condenser to efficiently operate under the noted conditions.

SUMMARY OF THE INVENTION

Accordingly, an object of the present invention is to provide greater refrigeration capacity per pound or given quantity of refrigerant circulating in the air conditioner circuit.

Another object is to provide for maximum dissipation of heat in the compressed refrigerant gas with minimum interference with the proper operation of the automobile radiator for cooling the automobile engine coolant.

Another object of this invention is to provide a simplified adjustment of the belts used for driving both the fan and the compressor, particularly where there is insufficient clearance for a single belt drive from the crankshaft pulley to the fan pulley and the compressor pulley.

Another object of this invention is to provide means for dissipating the superheat in the compressed refrigerant gas delivered direct from the compressor before further cooling the compressed refrigerant gas as is conventionally done directly in front of the automobile radiator wherein the automobile fan draws air first through the refrigerant gas condenser unit and then through the automobile radiator.

A still further object is to provide an improved and highly efficient method of air conditioning an automobile or other apparatus.

A still further object is to provide a linkage mechanism for tensioning two belts through an idler pulley for driving the fan and the compressor pulley from the crankshaft pulley.

Still further objects and advantageous of this invention will appear as the description proceeds.

To the accomplishment of the foregoing and related ends, the invention, then, consists of the method steps and means for air conditioning automobiles or other apparatus, hereinafter fully described and particularly pointed out in the claims, the annexed drawings, and the following description setting forth in detail certain means and modes for carrying out the invention, such disclosed means and modes illustrating, however, but one of the various ways in which the principle of the invention may be used.

Description of specific embodiment

Figure 1:
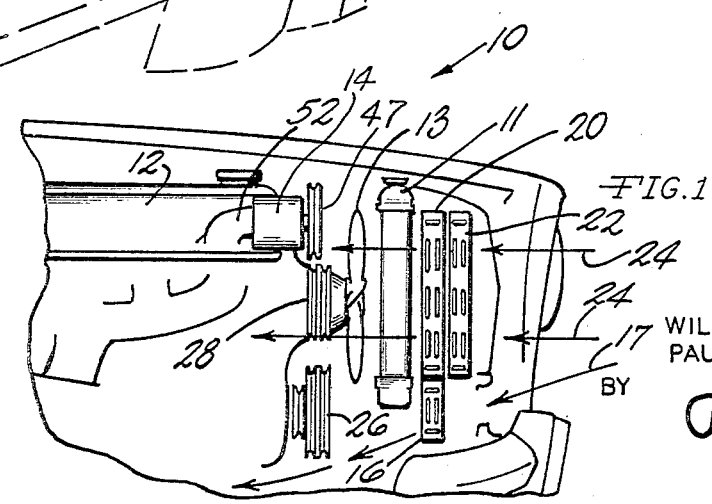
FIGURE 1 shows a fragmentary, diagrammatic, partial side view of the front portion of an automobile incorporating the refrigerant compressing and condensing portions of the air conditioning system of the present invention.
Figure 4:
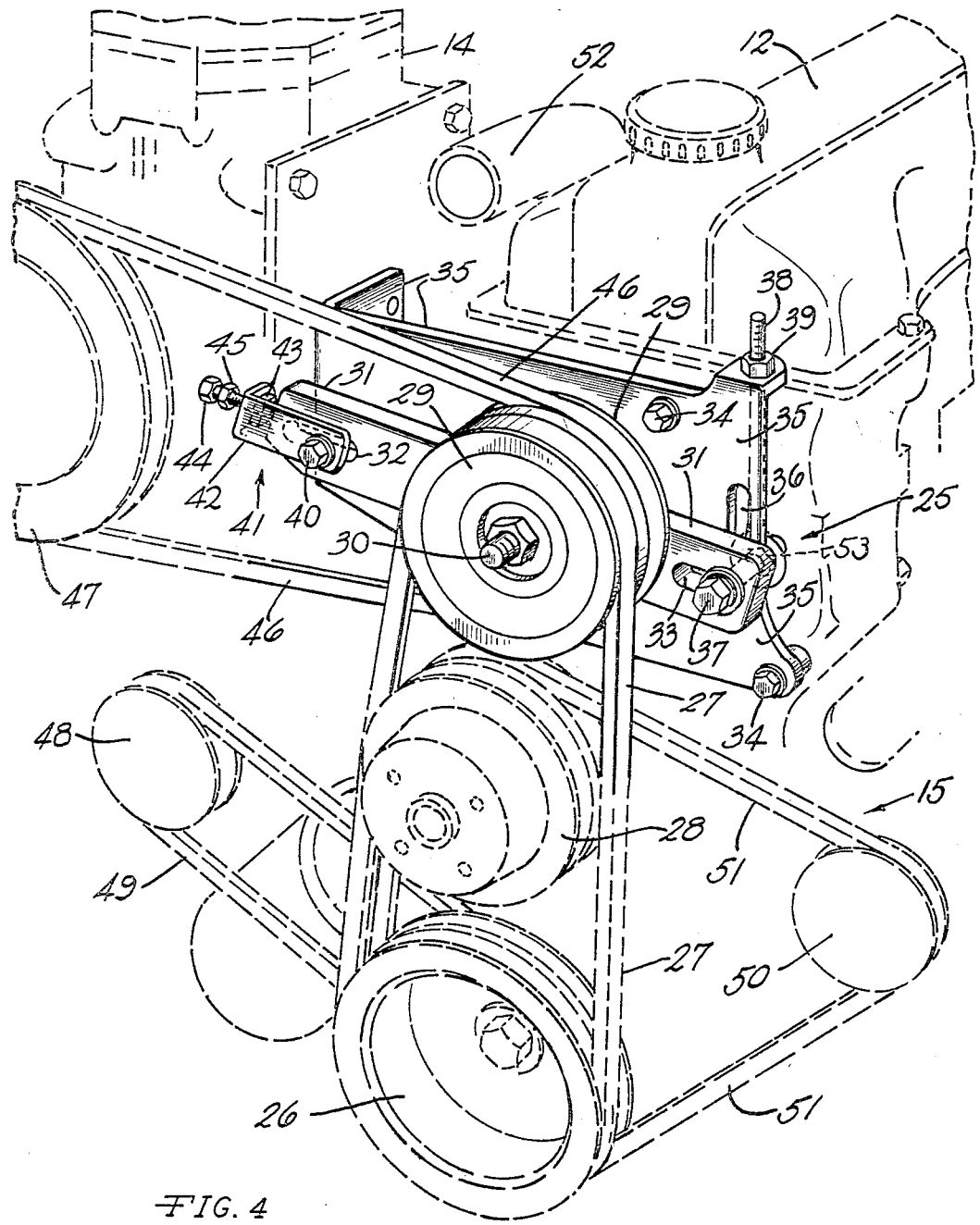
FIGURE 4 shows in enlarged front perspective the belt drive for the fan, refrigerant compressor and other belt driven members, and the improved belt tightening linkage.

Referring more particularly to FIGURE 1 of the drawings, the automobile 10 with its radiator 11 in conventional position in front of engine 12, and fan 13 between said radiator and engine, has very limited space for a compressor 14 and drive means for said compressor 14, fan 13 and the adjusting means for the drive belt combination 15 for same, FIGURE 4. The arrangement and operation of said drive belt combination 15 will be hereinafter described in detail.

In front of radiator 11, FIGURE 1, and extending below the bottom of same is a superheat dispensing condenser 16 wherein the cooling air 17 for same under forward movement of the automobile passes below the radiator 11 through condenser 16 and out under the engine 12, so as to dissipate much if not all of the superheat in the highly compressed refrigerant gas delivered from the compressor without seriously interfering with the normal operation of radiator 11 in cooling the radiator fluid or coolant used to cool the engine 12.

Figure 2:
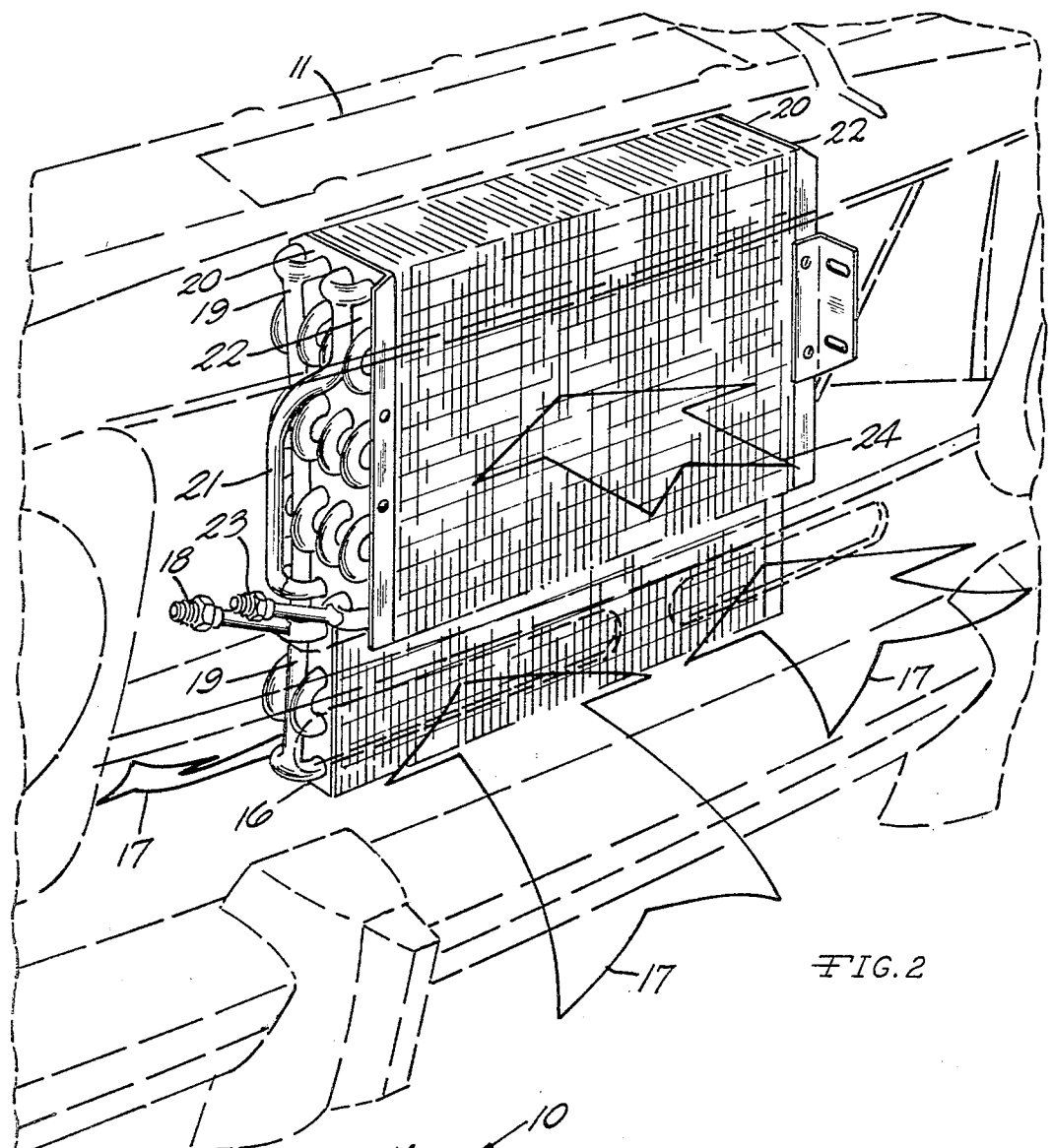
FIGURE 2 shows in enlarged perspective view the location of the improved refrigerant condenser members both below and in front of the automobile radiator.
Figure 3:
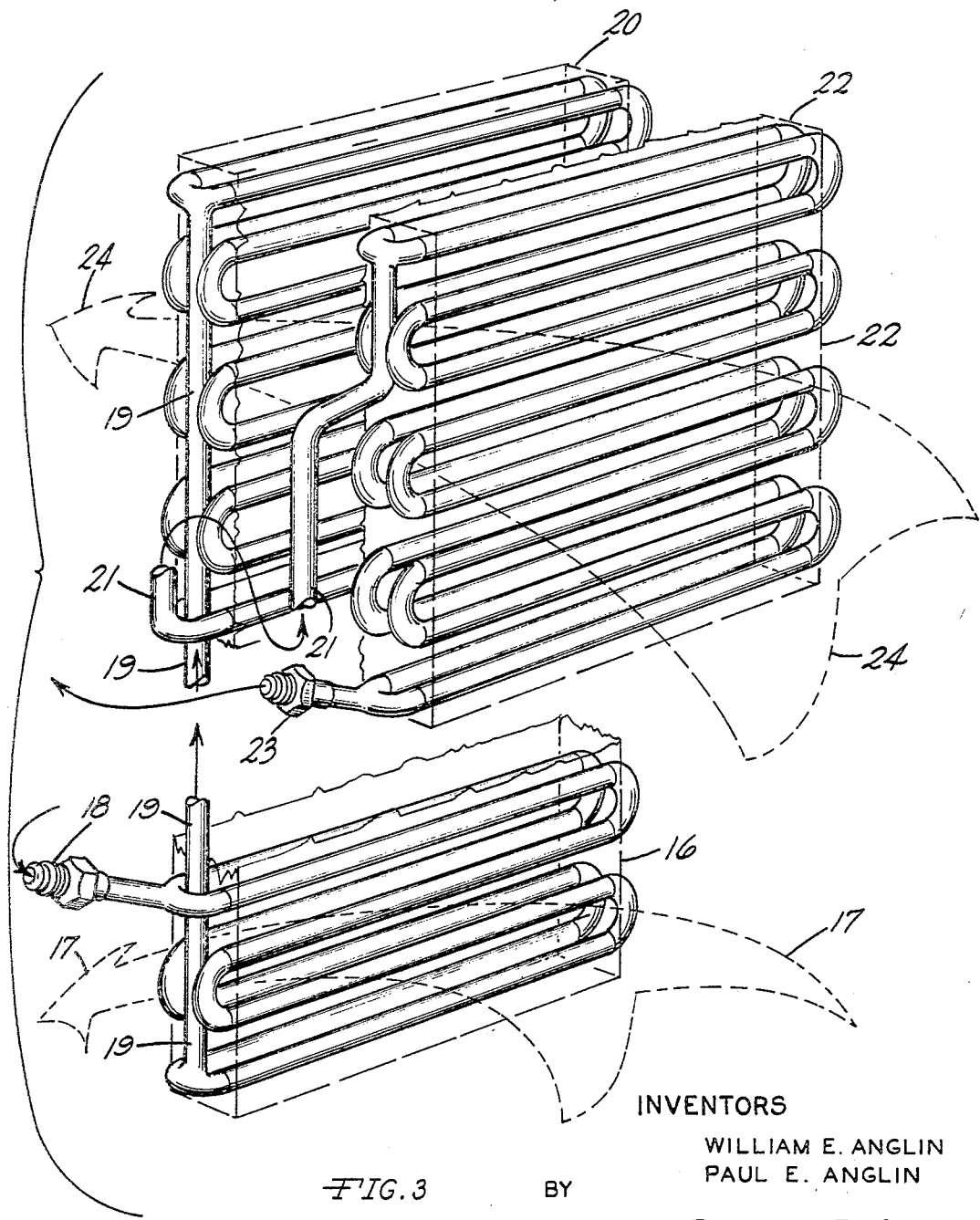
FIGURE 3 shows in enlarged front perspective the improved refrigerant condenser members and the path of flow of the compressed refrigerant gas through the serpentine passageways of same.

The compressed refrigerant gas is conventionally delivered from compressor 14, FIGURE 4, to the inlet connection 18, FIGURES 2 and 3, of the superheat dissipating condenser 16, preferably for directional flow through the condenser 16 from top to bottom and into outlet tube 19 which delivers same to the top of rear condenser 20, from whence the refrigerant flows serpentinely downward through the rear condenser 20 and into outlet tube 21 which preferably delivers the thus further precooled refrigerant gas to the top of front condenser 22 which is preferably similar to and parallel to rear condenser 20 and in front of same. The refrigerant in flowing to the bottom of front condenser 22 under normal operation is substantially completely liquefied by the cooling air flow 24 by the time it reaches outlet connection 23 from which it is conventionally delivered to the refrigerant expansion valve (not shown) for delivery into the evaporator unit (not shown) for high capacity conventional air conditioning cooling action. This expansion valve and evaporator unit are conventional and can, for instance, be as shown in U.S. Patent No. 3,355,908 issued to one of the present applicants, and are not illustrated in the drawings of the present invention since the present improvement is not in the expansion valve or evaporator unit.

Now referring to FIGURE 4, where the drive belt combination 15 is illustrated in detail with the belt adjusting assembly 25, to show this improved assembly in operating position. The whole belt drive assembly is driven by the automobile crankshaft through triple groove pulley 26 mounted on the end of same, FIGURES 1 and 4, to which is connected fan belt 27 and which if desired may engage one groove of a double groove fan pulley 28, FIGURE 1. Fan belt 27 extends past fan pulley 28 and passes around a double groove idler pulley 29 rotatably mounted on a stub shaft 30. This stub shaft 30, in turn, is anchored to an adjustable bar 31 which is provided with lengthwise extending slots 32 and 33 at each end of same.

Conventionally mounted on the upper front face of engine 12, as by means of bolts or studs 34, FIGURE 4, is a supporting plate 35 having an up and down slot 36 through which extends a tightenable stud 37 with the rear end of said stud closely but freely extending through the "eye" of eye bolt 38 having an adjusting nut 39. By loosening stud 37, eye bolt 38 can be moved endwise to adjust the tightness of fan belt 27 through upward movement of idler pulley 29, and then by tightening studs 37 and 40 this adjustment can be maintained. At the opposite end of supporting plate 35 from that having slot 36, is a stud 40 threadedly engaging same. This stud 40 passes through endwise extending slot 32 in adjustable bar 31. Mounted on stud 40 is an endwise adjusting means 41 for adjustable bar 31. One preferred form of this adjusting means consists of an angle member 42, the main leg of which has a hole through which stud 40 passes and anchors the adjusting means. The other end of said main leg portion is preferably bent backward substantially parallel to the end of adjustable bar 31 and is provided with a threaded portion 43 to threadedly engage an adjusting stud 44 with locknut 45. By loosening studs 37 and 40 the tightening of adjusting stud 44 will shift bar 31 to the right to tighten compressor drive belt 46 on idler pulley 29 and compressor drive pulley 47, which is preferably of the electro-lock clutch type or the equivalent, following which tightening of studs 37 and 40 will hold this adjustment.

The belt drive combination 15 may include a "smog pump" drive pulley 48 and drive belt 49 connecting same to a third groove on the back of crankshaft pulley 26, FIGURE 1. Most automobiles carry an electric generator or alternator with an operating pulley 50 driven by generator drive belt 51. This belt 51 preferably fits and lines up with a groove in crankshaft pulley 26 and also fan pulley 28. Pulleys 26 and 28, in this case, should be of the same diameter to provide positive drive for fan pulley 28 by both belts 27 and 51. However, where fan belt 27 is arranged to clear fan pulley 28, the fan may be driven solely by belt 51. The top hose connection 52, FIGURE 4, extends in conventional manner from the top of engine 12, over compressor drive belt 46, to the top of radiator 11.

It is thus to be seen that the present improved air conditioner invention provides a new way to more efficiently dissipate heat from the compressed refrigerant gases and also to provide a highly simplified assembly for tightening the fan and compressor drive belts while utilizing the limited space for same in efficient manner.

While a preferred embodiment of the invention has been illustrated and described herein, it is to be understood that modifications may be made in the method and air conditioning apparatus within the spirit and scope of the invention as herein described and illustrated. It is further to be noted that while directional terms have been used, same are not to be construed as limitations of the invention since such use has been availed of to better describe the invention as illustrated in the drawings.

Other modes of applying the principle of our invention may be employed instead of the one explained, change being made as regards the means and method steps herein disclosed, provided those stated by any of the following claims or their equivalent be employed.

We therefore particularly point out and distinctly claim as our invention:

1. An improved method of air conditioning an automobile having a radiator for cooling an engine-cooling liquid and utilizing a fan for drawing cooling air through said radiator, which comprises the steps of:
    (a) compressing the refrigerant gas used for air conditioning said automobile,
    (b) transferring said compressed refrigerant gas, which is superheated due to compressing same, from the point where same is compressed to a second point disposed beneath said radiator and in substantially the same vertical plane,
    (c) receiving said transferred compressed refrigerant gas at said second point and treating same there to dissipate substantially all the superheat in same by using cooling air normally passing beneath said radiator,
    (d) transferring said so-treated refrigerant gas and then conventionally cooling and condensing same through the use of said cooling air passing through said radiator under the influence of said fan, and
    (e) lastly, passing said condensed refrigerant through an expansion and heat absorbing air conditioning cycle and back to the point of recompressing same for recycling again.

2. An air conditioning system for automobiles with a radiator comprising in combination:
    (a) a refrigerant gas compressor,
    (b) a superheat dissipating condenser for said compressed refrigerant gas,
    (c) means delivering said compressed and superheated refrigerant gas from said compressor to said superheat dissipating condenser,
    (d) a rear condenser for said refrigerant gas, said condenser being located in front of said automobile radiator,
    (e) means for delivering said refrigerant gas from said superheat dispensing condenser to said rear condenser,
    (f) a front condenser located in front of said rear condenser,
    (g) means for delivering said refrigerant gas from said rear condenser to said front condenser, and (h) means for delivering the so-cooled and condensed refrigerant from said front condenser through an expansion valve and evaporator unit, where refrigeration takes place, and then back to said compressor for recycling.

3. An air conditioning system as set forth in claim 2, wherein
(a) said refrigerant gas compressor is belt driven through a series of belts and pulleys,
(b) there is an idler pulley in said series, and
(c) means for independently adjusting both the vertical and horizontal position of said idler pulley to provide a positive belt drive for said compressor.

4. An air conditioning system as set forth in claim 3, wherein
(a) said idler pulley is rotatably mounted on a stub shaft,
(b) an adjustable bar carrying said idler pulley stub shaft,
(c) said adjustable bar being slotted lengthwise at each end,
(d) stud means passing through each of said slots,
(e) a supporting plate behind said adjustable bar,
(f) means anchoring said supporting plate in fixed position,
(g) said stud means passing through said adjustable bar slots serving to anchor said bar to said supporting plate in various endwise adjusted positions,
(h) means at one end of said bar for endwise adjusting same relative to said stud means for operably varying the tightness of at least one of said belts, and
(i) means at the other end of said bar for sidewise adjustment of same for operably varying the tightness of at least another of said belts.

5. An air conditioning system as set forth in claim 2, wherein
(a) there is a fan for drawing cooling air through said automobile radiator and said front and rear refrigerant condensers in front of said radiator,
(b) a source of power with belt and pulley means connected to same for driving both said fan and said refrigerant gas compressor, and
(c) said belt and pulley means including an idler pulley and belts passing around said idler pulley for at least driving said compressor.

6. An air conditioning system as set forth in claim 5, wherein
(a) there is an adjustable position bar on which said idler pulley is rotatably mounted,
(b) means for supporting said adjustable position bar, and
(c) means for adjusting said bar lengthwise and at least one end sidewise relative to said belts passing around said idler pulley to adjust the operating tightness of same.

7. An air conditioning system as set forth in claim 2, wherein
(a) said superheated refrigerant gas is delivered from said compressor to the top of said superheat dissipating condenser,
(b) said means for delivering said refrigerant gas from said superheat dissipating condenser to said rear condenser takes said gas from the bottom of said superheat dissipating condenser and delivers it to the top of said rear condenser,
(c) said means for delivering said refrigerant gas from said rear condenser to said front condenser, takes said refrigerant gas from the bottom of said rear condenser and delivers it to the top of said front condenser, and
(d) said means for delivering said so-cooled and condensed refrigerant from said front condensor to said expansion valve, takes same from the bottom of said front condenser.

8. An air conditioning system as set forth in claim 7, wherein
(a) said refrigerant gas compressor is belt driven through a series of belts and pulleys,
(b) there is an idler pulley in said series, and
(c) means for adjusting the position of said idler pulley to provide a positive belt drive for said compressor.

9. An air conditioning system as set forth in claim 7, wherein
(a) there is a fan for drawing cooling air through said automobile radiator and said front and rear refrigerant condensers in front of said radiator,
(b) a source of power with belt and pulley means connected to same for driving both said fan and said refrigerant gas compressor, and
(c) said belt and pulley means includes an idler pulley and belts passing around said idler pulley for at least driving said compressor.

10. An air conditioning system as set forth in claim 9, wherein
(a) there is an adjustable position bar on which said idler pulley is rotatably mounted by means of a stub shaft,
(b) means for supporting said adjustable position bar, and
(c) means for adjusting said bar lengthwise and at least one end sidewise to adjust the operating tightness of said belts passing around said idler pulley.

11. An air conditioning system for automobiles with a radiator comprising in combination:
(a) a refrigerant gas compressor,
(b) a superheat dissipating condenser for said compressed refrigerant gas,
(c) means for mounting said superheat dissipating condenser beneath the bottom of said automobile radiator and in substantially the same vertical plane, in a position for exposure to air passing beneath the radiator,
(d) means delivering said compressed and superheated refrigerant gas from said compressor to said superheat dissipating condenser,
(e) a main condenser for said refrigerant gas, said consenser being located in front of said automobile radiator, for exposure to air passing through the latter,
(f) means for delivering said refrigerant gas from said superheat dissipating condenser to said main condenser, and
(g) means for delivery the so-cooled and condensed refrigerant from said main condenser to and through an expansion valve and evaporator unit, where refrigeration takes place, and then back to said compressor for recycling.

References Cited
UNITED STATES PATENTS

| | | | |
|---|---|---|---|
| 2,774,220 | 12/1956 | Heym | 62—244 |
| 2,784,562 | 3/1957 | Gamundi | 62—244 |
| 3,087,312 | 4/1963 | White | 62—244 |
| 3,220,211 | 11/1965 | Nordquest | 62—244 |
| 3,411,316 | 11/1968 | Wright | 62—241 |

WILLIAM J. WYE, Primary Examiner

U.S. Cl. X.R.

62—61, 241